United States Patent Office 3,347,810
Patented Oct. 17, 1967

3,347,810
PROCESS FOR PREVENTING SULFUR LOSS FROM CHLOROSULFONATED POLYETHYLENE
Paul Robert Johnson, Wilmington, Del., assignor to E. I. du Pont de Nemours and Company, Wilmington, Del., a corporation of Delaware
No Drawing. Filed Dec. 23, 1964, Ser. No. 420,822
5 Claims. (Cl. 260—29.6)

This invention relates to a method for stabilizing chlorosulfonated polyethylene against loss of sulfur while it is being processed into a latex form.

A typical procedure for preparing a chlorosulfonated polyethylene latex involves mixing an organic solvent solution of the solid polymer with water in the presence of an emulsifying (or surface-active) agent, and subsequently removing the organic solvent to provide the aqueous dispersion of the solid polymer. In a prior art process such as described in U. S. Patent 2,968,637, the organic solvent is removed by distillation at 50° C. under reduced pressure. For greater production efficiency and economy, it is desirable to distill off the organic solvent under atmospheric pressure at the boiling point of the solvent. When such distillation was attempted, it was found that as the temperature is increased above 50° C. and the solvent is removed at its boiling point under atmospheric pressure, the sulfur content of the chlorosulfonated polyethylene decreased sharply due to an undesirable loss in sulfonyl chloride groups. These effects were also accompanied by a decrease in the pH of the latex. This change due to loss of sulfur in the chlorosulfonated polyethylene in the amounts caused by the above process, destroys the utility of the latex in adhesive compositions.

It has been discovered that in a process for preparing a chlorosulfonated polyethylene latex comprising the steps of (1) dissolving the chlorosulfonated polyethylene in a water-immiscible solvent, (2) adding water and emulsifying the mixture, and (3) removing the solvent by distillation at temperatures from about 50 to 100° C.; that if an amount of a compound or combination of compounds selected from the group consisting of substituted phenols, and cresols, alkali metal nitrites, thiazoles, thiuram mono- and polysulfides, organic nitrocompounds, and organic oximino compounds is added prior to distillation, serious change in sulfur content or pH may be prevented. The amount of stabilizer added ordinarily consists of at least about 0.1% based on the weight of the chlorosulfonated polyethylene.

The chemical stabilizers which have been discovered are from chemical classes comprising mono- and dialkyl-substituted phenols and cresols wherein alkyl is $C_1$ to $C_8$, thiazoles, thiuram sulfides, alkali metal nitrites, organic nitro compounds, and organic oximino compounds. Representative members are: 4,4'-methylene-bis (2,6-di-t-butyl phenol); 4,4'-thio-bis (6-t-butyl-3 methyl phenol); 2,2' - benzothiazyl disulfide; 2 - mercaptobenzothiazole, tetramethylthiuram monosulfide; tetramethylthiuramdisulfide; tetraethylthiuramdisulfide; sodium nitrite; potassium nitrite; 2,4-dinitrotoluene, and quinone dioxime. A preferred stabilizer is sodium nitrite. A combination of sodium nitrite and one of the above mentioned stabilizers has also been found effective. The chemical stabilizers are effective in concentrations above about 0.1% by weight based on the chlorosulfonated polyethylene. Below 0.1% stabilization falls off rapidly and it is usually found uneconomical to use more than 2 or 3%. A preferred range is 0.25 to 0.5% by weight.

The chemical stabilizers used in the improved process must be added before the distillation step which removes the organic solvent from the emulsion and yields the aqueous latex dispersion. It is preferred to add them in accordance with their solubilities in the two phases. Thus, oil-soluble stabilizers are added to the organic solvent solution of the chlorosulfonated polyethylene, and water-soluble stabilizers are added to the water used for emulsification. It is also practical to add the stabilizer during the emulsification step so long as it is thoroughly mixed into the system before the solvent is distilled off.

The preparation of chlorosulfonated polyethylene is well-known, and processes set forth in U.S. Patents 2,212,786; 2,586,363; 2,646,422; 2,862,917; 2,972,604; and 2,982,759 may be used. Preferred polymers for adhesive compositions are those prepared by the chlorosulfonation of polyethylenes having densities from about 0.94 to 0.96 gm./cc., and melt indices of about 0.07 to 4 decigrams/minute (ASTM Method D–1238–57T). The preferred chlorosulfonated polymers contain about 10 to 26 percent chlorine and about 0.5 to 3 percent sulfur by weight. It is essential that the polymer in the adhesive latex retain at least 0.5 percent sulfur by weight after the distillation process. Results show that adhesion falls off sharply below 0.5 percent and at values as low as 0.2 to 0.3 percent, the latex is useless as an adhesive.

In operating the improved process of this invention the chlorosulfonated polyethylene is dissolved in an organic, water-immiscible solvent which is capable of distillation without change under acid conditions. Representative suitable solvents are carbon tetrachloride, benzene and toluene.

The concentration of chlorosulfonated polyethylene in the solution is not critical, but about 10% by weight is preferred to provide a suitable viscosity for emulsification. When it is desired to use one of the oil-soluble chemical stabilizers, e.g., a substituted phenol, for the distillation step, it is preferably stirred into the solvent solution of chlorosulfonated polyethylene.

In the next step of the latex preparation the polymer solution is mixed with water, under conventional high-speed homogenizing conditions, in the presence of a surface-active agent which is stable under acidic pH conditions. Water soluble organic emulsifying agents or mixtures which provide oil-in-water emulsions are used. The term "oil-in-water" emulsifying agents is well understood by those skilled in the art, and is set out in detail in the book "Surface Active Agents," Swartz and Perry, Interscience Publishers, Inc. (1949) pages 9–12, 54, 116–120. Particularly useful anionic emulsifying agents are the sodium salts of long-chain alkyl sulfonic acids, or long-chain alkyl hydrogen sulfates, or long-chain alkyl-substituted aryl sulfonic acids. A typical procedure involves dissolving the emulsifying agent in an emulsion modifier, soluble in both the aqueous and solvent phases. A preferred example of such a modifier is isopropanol. The solution of the emulsifying agent in the emulsion modifier is conveniently made at a concentration of 5 to 10% by weight.

The optimum amount of modifier needed in a given system can readily be determined by those skilled in the art. If too little modifier is used, the latex may not have as fine a particle size as desired. Too much modifier may lead to the formation of coagulum. The solution of the emulsifying agent in the emulsification modifier is conveniently added to the organic solvent solution of the chlorosulfonated polyethylene just prior to emulsification.

When it is desired to use a water-soluble chemical stabilizer, e.g., sodium nitrite, for the distillation step, it is preferably stirred into the water portion to be used in the emulsification just prior to emulsification.

The third step of the latex preparation involves removal of the organic solvent from the emulsion. This may be done batch wise, semi-continuously, or continuously. With a batch wise process, a vessel containing the emulsion and the chemical stabilizer for the chlorosulfonated polyethylene is heated in a 100° C. bath gradually to the boiling point of the solvent under atmospheric pressure. The solvent or solvent mixture distills and is recovered for reuse.

After the solvent has been removed the temperature approaches 100° C. (the boiling point of water) and distillation is continued for about 15 additional minutes to insure removal of the solvent, and the emulsion modifier if one is used. The latex is cooled, strained and stored for use.

With a semi-continuous process, a portion of the emulsion is heated in a 100° C. to 125° C. bath until solvent distills off at its atmospheric boiling point, and the temperature approaches 90° C. At this point, the remainder of the emulsion is fed slowly into the vessel, keeping the temperature of the latex at about 90–95° C. After all the emulsion is added, distillation is continued until the temperature is about 100° C. The latex is then cooled, strained and stored for use.

As mentioned, the latices prepared by the process of this invention are particularly useful for applications where the presence of sulfonyl chloride groups is essential to the development of adhesion. For example, they may be used in compositions for paints, fabric coatings, impregnating solutions, and adhesives.

The invention will now be described with referenec to the following examples of specific embodiments thereof wherein parts and percentages are by weight unless otherwise specified.

*Example I*

(a) A chlorosulfonated polyethylene is selected containing (by weight) about 19% chlorine and 0.9% sulfur, prepared from linear polyethylene having a melt index of about 4. In a 500 ml. flask equipped with a stirrer, thermometer, reflux condenser, and a heating mantle, 30 gm. of the chlorosulfonated polyethylene is dissolved in 300 ml. of benzene at 60°–70° C. To this solution is added with stirring 35 ml. of warm isopropanol containing 2.4 gm. of a sodium alkylbenzene sulfonate surface-active agent. When an oil-soluble stabilizer is employed, about 0.3 gm. is added to this benzene solution. (See Table I.)

The benzene solution is added to 160 ml. of distilled water at 65–70° C. in a separate vessel. When a water soluble stabilizer is employed, as noted in Table I, about 0.3 gm. is dissolved in the water prior to addition to the benzene solution. The benzene solution is added to the water solution in a 1500 ml. vessel, and using a homomixer for 3 to 5 minutes an emulsion is prepared. The pH of this emulsion is about 6.7. The emulsion is distilled from a 1 or 2 liter flask by heating slowly with an oil bath until the temperature reaches about 90° C. This requires about 1 hour. Heating is continued for about 15 additional minutes to insure complete removal of benzene and isopropanol. The latex is cooled, strained, and its pH measured. A sample of the latex is coagulated with acetone, washed with acetone and water, air dried overnight, followed by drying at 60° C. in vacuum for 3 hours, and analyzed for sulfur content. Results are shown in Table I.

TABLE I

| Stabilizer | pH of latex after distillation of solvent | Percent residual sulfur after distillation |
|---|---|---|
| 2,6-di-t-butyl-p-cresol [1] | 2.7 | 0.6 |
| 4,4'-methylene-bis(2,6-di-t-butyl phenol) [1] | 3.0 | 0.6 |
| 4,4'-thio-bis(6-t-butyl-3-methyl phenol) [1] | 3.1 | 0.6 |
| Quinone dioxime [1] | 4.8 | 0.8 |
| Benzothiozyl disulfide [1] | 5.4 | 0.9 |
| Sodium nitrite [2] | 6.3 | 0.8 |
| Tetramethyl thiuram disulfide [1] | 6.7 | 1.0 |
| None | 1.9 | 0.3 |

[1] Stabilizer is added to the benzene solution.
[2] Stabilizer is added to the water.

(b) The above procedure is repeated with the same chlorosulfonated polyethylene, using sodium nitrite as the stabilizer, except after the solvent distillation step, the latex is held under reflux at about 100° C. for about two additional hours. The latex is then cooled and tested as described above. The pH is 5.4, and the residual sulfur is 0.8%.

*Example II*

The procedure of Example I(a) is followed with the same chlorosulfonated polyethylene, except 0.15 gm. (0.5% by weight on the chlorosulfonated polyethylene) of a chemical stablizer is used. Results are shown in Table II.

TABLE II

| Stabilizer | pH of latex after distillation of solvent | Percent residual sulfur after distillation |
|---|---|---|
| 2,4-dinitrotoluene [1] | 3.7 | 0.7 |
| Tetramethyl thiuram disulfide [1] | 5.3 | 0.8 |
| Sodium nitrite [2] | 5.3 | 0.9 |

[1] Stabilizer is added to the benzene solution.
[2] Stabilizer is added to the water.

*Example III*

The procedure of Example I(a) is followed except 0.03 gm. (0.1% by weight on the chlorosulfonated polyethylene) of a chemical stabilizer is used.

Results are shown in Table III.

TABLE III

| Stabilizer | pH of latex after distillation of solvent | Percent residual sulfur after distillation |
|---|---|---|
| Tetramethyl thiuram disulfide [1] | 2.3 | 0.5 |
| Sodium nitrite [2] | 4.6 | 0.9 |

[1] Stabilizer is added to the benzene solution.
[2] Stabilizer is added to the water.

*Example IV*

A chlorosulfonated polyethylene is selected containing by weight about 26% chlorine and 1% sulfur, prepared from a linear polyethylene having a melt index of about 4. The procedures of Example I(a) are followed except the stabilizers are used and results obtained as shown in Table IV.

TABLE IV

| Stabilizer | Percent by weight on the chlorosulfonated polyethylene | pH of latex after distillation of solvent | Percent residual sulfur after distillation |
|---|---|---|---|
| Sodium nitrite [1] | 0.5 | 4.8 | 0.8 |
| Sodium nitrite [1] plus | 0.2 | 5.0 | 1.1 |
| 2,4-dinitrotoluene [2] | 0.2 | | |
| None | | 2.5 | 0.28 |

[1] Stabilizer is added to the water.
[2] Stabilizer is added to the benzene solution.

*Example V*

A chlorosulfonated polyethylene is selected containing (by weight) about 34% chlorine and about 1.15% sulfur, prepared from linear polyethylene having a melt index of about 4. The procedure of Example II is followed using sodium nitrite as the stabilizer. The sodium nitrite is added to the water. After distillation of the solvent, the latex has a pH of 4.4 and a residual sulfur content of 1.14%.

Another preparation of latex made without the stabilizer has a pH of 2.4 and a residual sulfur content of 0.68%.

Example VI

A chlorosulfonated polyethylene is selected containing (by weight) about 29% chlorine and 1.4% sulfur, prepared from a low-density polyethylene having a melt index of about 10. The procedure of Example II is followed using sodium nitrite as the stabilizer. The sodium nitrite is added to the water. After distillation of the solvent, the latex has a pH of 4.2.

Another preparation of latex made without the stabilizer has a pH of 2.2.

Example VII

The chlorosulfonated polyethylene of Example I(a) is dissolved in benzene and emulsified as described therein, using the chemical stabilizers as shown in Table V. The semi-continuous process as described above is used to produce the latex. Two batches are made. The distillation to remove solvent is conducted by putting about ¼ of the emulsion in a 1-liter flask equipped with stirrer, dropping funnel, still head, condenser, thermometer and receiver. The flask is heated with an oil bath at 100° to 120° C. Solvent is distilled until the temperature is about 90° C., and the balance of the emulsion is added slowly from the dropping funnel over a period of about 5 hours. When all the solvent is removed, the temperature rises to about 100° C. and is held there for about 1 hour more. The latex is then treated as described in Example I. Analyses are shown in Table V.

TABLE V

| Stabilizer | Percent by weight on the chlorosulfonated polyethylene | pH of latex after distillation of solvent | Percent residual sulfur after distillation |
|---|---|---|---|
| Sodium nitrite [1] | 0.5 | 5.4 | 0.8 |
| Sodium nitrite [1] plus 2,4-dinitrotoluene [2] | 0.1 0.1 | 2.7 | 0.7 |
| Sodium nitrite [1] plus 2,4-dinitrotoluene [2] | 0.25 0.1 | 4.3 | 0.9 |
| None | | 2.3 | 0.27 |

[1] Stabilizer is added to the water.
[2] Stabilizer is added to the benzene solution.

As stated above and illustrated by these data, it is evident that even minute quantities of these stabilizers as low as 0.1% by weight of the chlorosulfonated polyethylene (Example III) can be effective in preventing a damaging loss of sulfur from the adhesive latex. However, greater stabilization is achieved with the preferred concentrations of about 0.25 to 0.5% by weight based on the chlorosulfonated polyethylene. This stabilization is effective even at temperatures as high as about 100° C. Optimum results may be obtained by routine variation of the components and conditions by those skilled in the art.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:
1. A process for the prevention of serious sulfur loss from a chlorosulfonated polyethylene polymer during the preparation of an aqueous latex of said polymer by dissolving the chlorosulfonated polyethylene in a water-immiscible solvent, adding water and emulsifying the mixture, and removing the solvent by distillation of the emulsion at a temperature from about 50 to 100° C.; which process comprises adding at least about 0.1% based on the weight of the chlorosulfonated polyethylene of a stabilizer from the group consisting of mono- and di-alkyl-substituted phenols and cresols wherein alkyl is $C_1$ to $C_8$, alkali metal nitrites, 2-mercaptobenzothiazole, 2,2'-benzothiazyl disulfide, thiuram mono- and polysulfides, dinitrotoluenes, and quinone dioxime prior to removing the solvent.

2. The process of claim 1 in which the stabilizer is selected from the group consisting of 2,6-di-t-butyl-p-cresol; 4,4'-methylene-bis(2,6-di-t-butyl phenol); 4,4'-thio-bis(6-t-butyl-3-methyl phenol); benzothiazyl disulfide; sodium nitrite; tetramethyl thiuram disulfide and 2,4-dinitrotoluene.

3. The process of claim 1 in which the chlorosulfonated polyethylene contains about 20% chlorine and 1% sulfur and is prepared from linear polyethylene having a melt index of about 4, and the stabilizer is sodium nitrite employed in the amount of about 0.25 to 0.5% by weight based on the chlorosulfonated polyethylene.

4. The process of claim 1 in which the stabilizer is a combination of sodium nitrite and 2,4-dinitrotoluene in which at least about 0.1% sodium nitrite by weight on the chlorosulfonated polyethylene is used.

5. The process of claim 2 in which the stabilizer is sodium nitrite.

References Cited
UNITED STATES PATENTS

| | | | |
|---|---|---|---|
| 2,557,474 | 6/1951 | Sanderson | 260—45.9 |
| 2,723,255 | 11/1955 | Busse et al. | 260—45.9 |
| 2,809,950 | 10/1957 | Powers | 260—29.6 |
| 2,879,257 | 3/1959 | Walter et al. | 260—45.9 |
| 3,147,315 | 9/1964 | Ennis et al. | 260—45.95 |
| 3,247,162 | 4/1966 | Newland et al. | 260—45.9 |

MURRAY TILLMAN, *Primary Examiner.*

W. J. BRIGGS, Sr., *Assistant Examiner.*